O. K. OLSON.
HEN'S NEST.
APPLICATION FILED FEB. 8, 1921.
1,402,790.
Patented Jan. 10, 1922.
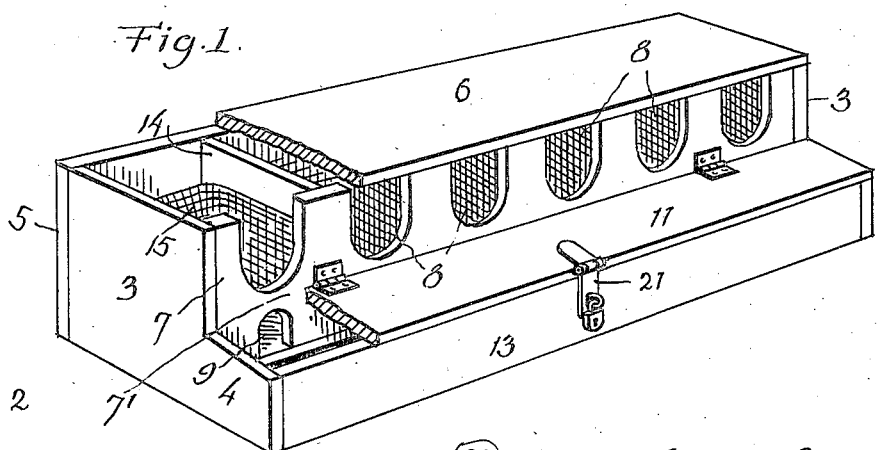
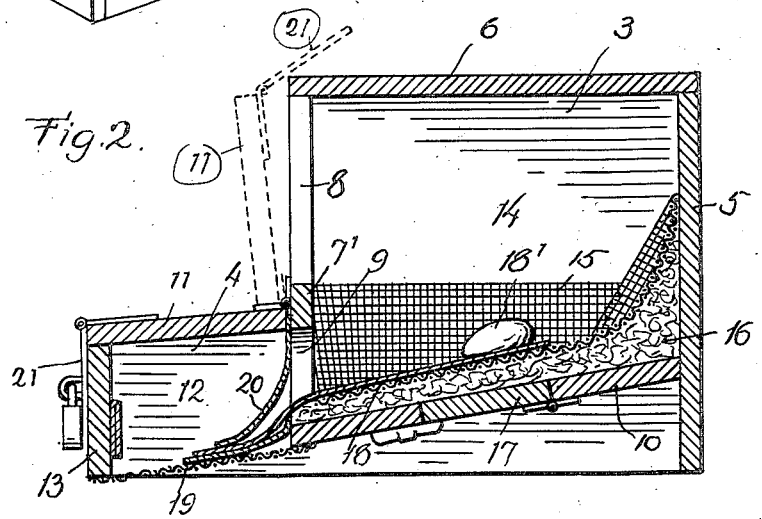
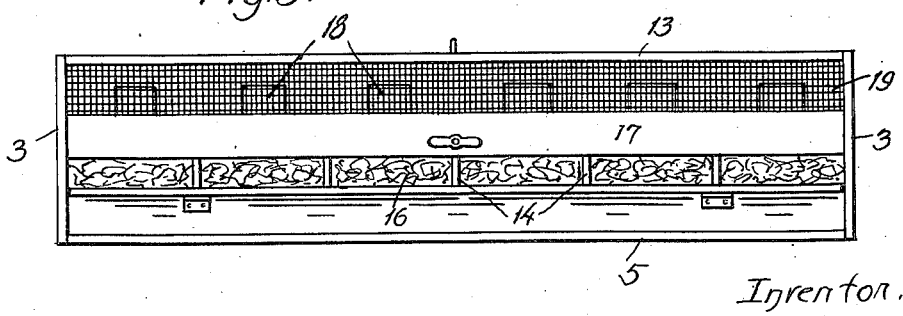
Inventor:
Ole K. Olson,
by E. W. Anderson & Son
Attorneys.

UNITED STATES PATENT OFFICE.

OLE K. OLSON, OF OAKDALE, NORTH DAKOTA.

HEN'S NEST.

1,402,790.  Specification of Letters Patent.  Patented Jan. 10, 1922.

Application filed February 8, 1921. Serial No. 443,365.

*To all whom it may concern:*

Be it known that I, OLE K. OLSON, a citizen of the United States, resident of Oakdale, in the county of Dunn and State of North Dakota, have made a certain new and useful Invention in Hens' Nests; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to nests for poultry or hens' nests, having for an object to provide a nest capable of being made economically and in batteries of two or more, which will be attractive to the hens and efficient in its use, and which will be capable of being easily cleaned and kept in cleanly condition.

The invention consists in the novel construction and combinations of parts, as hereinafter set forth.

In the accompanying drawings illustrating the invention, Figure 1 is a perspective view of the invention, partly broken away; Figure 2 is a transverse vertical section of the same, showing the door of the egg chamber raised in dotted lines, and Figure 3 is a bottom plan view of the invention, with the door of the excelsior chamber open.

In these drawings, the numeral 2 designates the nest made up in the form of a battery or plurality of nests in a unitary frame or casing, consisting of end walls 3, 3, having each a forward extension 4; a back wall 5; a permanent or stationary top wall 6; a front wall 7 having an upper series or plurality of entrance openings 8 for the hens and a lower series of exit openings 9 for eggs; an inclined bottom wall 10 located above or spaced apart from the lower edges of said end walls and of said rear wall; a hinged top or cover 11 for the forward extension chamber 12 for eggs formed by the forward extensions of said end walls and a front wall 13, for said forward extension chamber.

The main chamber is provided with partitions 14 between the entrance openings 8 dividing it into a number of nests, within each of which is provided a wire cloth bottom 15 extending upon an incline upwardly from the front portion of the nest to the rear portion thereof to leave a space or chamber 16 between the same and the bottom board 10 of the frame or casing, and within which is placed excelsior or straw which extends to some extent through the openings of the wire bottom and is visible to the hens therethrough, giving the appearance or impression that the nest is made at least partly of straw and at the same time rendering the nest capable of being easily cleaned by removing the straw when soiled through a door 17 in the bottom 10 and replacing the same with new straw, said door being common to all of the nests of the battery and accessible from beneath the casing.

Overlying the forward and central portion of the wire cloth bottom of each nest is a pad strip of canvas or similar material 18 to the rear end of which, located centrally of the nest, is secured an artificial nest egg 18', said strip of canvas having a downward inclination from said egg forwardly of the nest in accord with the inclination of the wire cloth bottom and extending through its related egg exit opening 9 and being continued downwardly into the collection or magazine chamber 12 for eggs. The chamber 12 is provided also with an inclined wire cloth bottom 19 attached at its rear edge to and forming a single incline with the bottom 10 of the main chamber. The bottom 19 of the egg collection chamber forms a substantially single incline with the wire cloth bottom 15 of the nest, broken only by a slight shoulder at the juncture thereof. The egg exit openings 9, are provided each with a curtain of canvas or cloth 20, which is adapted to check the eggs as they pass downwardly into the chamber 12 and avoid danger of breaking the same, and said chamber may be padded at front and ends.

The main chamber is made up of four boards for bottom, top, front and rear walls, together with end boards or walls, the forward extensions of the latter constituting end walls for the forward extension chamber 12, a top and a front wall completing the wood work or casing of said chamber 12. The end walls and rear wall of the main chamber being of greater height than said chamber serves to lift the bottom board 10 from the ground or support whereon the nest is placed, and enables the wire cloth bottom of the chamber 12 to be inclined as stated when attached to the bottom wall of the main chamber and to the front wall of the chamber 12. The front wall of the main chamber arranged as stated is enabled to be provided with upper openings forming entrance openings to the nests, and with lower openings forming exit openings for the eggs to the egg collection or magazine chamber 12, the latter being common to all of the nests of the battery. The horizontal strip of wood 7' of the front wall of the main chamber located between the upper and lower series of openings stated is adapted to form a convenient place whereon to hinge the cover 11 for the egg collection chamber.

The egg exit openings 9 being formed in the front wall of the nest immediately below the entrance openings 8, are enabled to be entirely concealed from the hens. The casing of the invention may be made of wood or of metal as desired, and in units of from one to six or more nests. The removable or hinged cover 11 has a breadth about or nearly equal to the height of the front wall 7 above said cover, whereby the latter when raised as shown in dotted lines in Figure 2 enables the hasp member 21 of the padlock device of said cover, to be turned over the top 6 of the nest, as also shown in dotted lines, and there fastened temporarily, while removing the eggs from the chamber 12.

I claim:

In a hen's nest, a box form casing, the front wall of which is provided with an upper entrance opening for the hen, and a lower exit opening for the eggs, a forwardly and downwardly inclined screen bottom for the nest leading to said exit opening and spaced apart from the bottom of said casing to provide a chamber for excelsior, the bottom of said chamber having a door therein accessible from beneath the casing and a forward collection chamber for eggs communicating in rear with said exit opening and provided with an inclined bottom in continuation of and forming a substantially single incline with that of said screen bottom of the nest.

In testimony whereof I affix my signature in presence of two witnesses.

OLE K. OLSON.

Witnesses:
T. H. H. THORESEN,
JOHN BANG.